April 2, 1929.  W. N. CLURMAN  1,707,459

CONTROLLING DEVICE FOR ELECTRIC MOTORS

Filed March 29, 1927

Inventor
Will N. Clurman
By his Attorney
S. J. Cox.

Patented Apr. 2, 1929.

1,707,459

UNITED STATES PATENT OFFICE.

WILL N. CLURMAN, OF LONG BEACH, NEW YORK.

CONTROLLING DEVICE FOR ELECTRIC MOTORS.

Application filed March 29, 1927. Serial No. 179,203.

My invention relates to safety automatic control systems for controlling oil burners, especially those systems having a control motor affected by a thermostatic switch to cause the control motor to operate under certain conditions for a predetermined period, and under other conditions to operate for another predetermined period to carry out a predetermined cycle of operation.

In this type of oil burning system the sequence of operations necessary to bring the burner into full operation is controlled by a rotary switch, and is maintained operating so long as a safety control operated by the heat of the flame, or some other suitable method, is in the heated position.

It frequently happens that while the rotary switch is in the normal operating position the line current is interrupted because of an opened switch or a temporary interruption of current supply to the building or an interruption of the flame occurs.

When the line current is again established the burner will now be stopped because of the cooling of the safety control, and it will therefore be necessary for some one to manually adjust the switch so that the normal automatic starting operations may be carried out, and if this interruption occurs during the night or any other time when no one is at hand and able to observe its effect, the heating plant may remain out of operation until discomfortable or even damaging results have followed.

The primary object of my invention is to provide a rotary line switch which will avoid this difficulty and so arranged that should the line current be interrupted, the usual cycle of operations will be carried out upon resumption of the line current without the necessity of manual adjustment of the switch.

My invention is particularly adapted to those types of automatically controlled furnaces, oil burners, and the like, employing rotary switches to carry out the proper cycle of operations. It is illustrated in the accompanying drawings, in which—

Fig. 1 diagrammatically shows the arrangement of the control unit of a thermostatically controlled heating system embodying the improvements.

In the accompanying drawings, an organization is depicted including a combustion safety control and a motor switch, the latter comprising a control motor, a maintaining switch and a line switch. The relation and functions of these elements will be apparent from the accompanying description.

Figure 1:
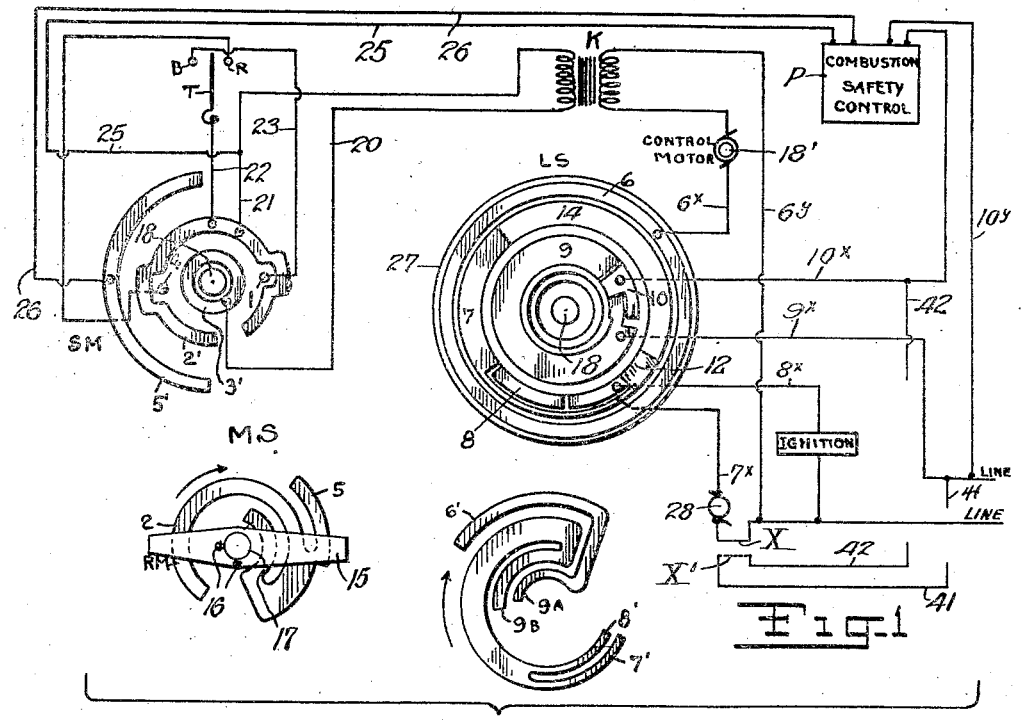
Figure 2:
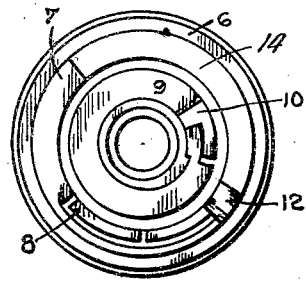
Fig. 2 is a plan view of the stationary member of my rotary line switch.

Referring to Fig. 1, a maintaining switch MS having a stationary member SM and a rotary member RM is shown in connection with a thermostatic element T. The stationary member of the maintaining switch, consists of a bakelite plate in which two circular tracks 2' and 3' are moulded. There are gaps or breaks at diametrically opposite points in track 2', and in these breaks or gaps are located independent contact buttons, 1 and 4. The stationary member also is provided with an outer segment 5' which bridges one of the contact buttons and also the gap, or break in track 2'. The rotary member consists of a spring bronze stamping mounted on a bakelite support 15 and arranged to be fastened to a shaft 18 through set screws 16 on a hub 17 which is riveted to the bakelite. The spring bronze stamping consists of fingers 2, 3 and 5, which contact, as hereinafter set forth, with the circular tracks 2', 3', and segment 5' and buttons 1 and 4 of the stationary member. The ends of fingers 2, 3 and 5, incline or project away from the plane of bakelite support 15. As shown, wire 25 leads from wire 21, and wire 26 leads from segment 5'. Said wires 25 and 26 run to a low voltage mercury tube switch 33 or other suitable switch in a combustion safety control P, more fully explained hereinafter. The inner contact track 3' of the stationary member, SM, connects by wire 20 to one end of the secondary of a choke coil K. The other end 21, of the secondary connects to the outer track 2' and another connection 22 from track 2' runs to the thermostat element T. An independent connection 23 runs from the button 1 to the contact button B, and another independent wire 24 connects buttons 4 and R. Although all circuits connected through the maintaining switch MS are "secondary", for convenience the circuit represented by track 2', wire 21, choke K, wire 20, track 3' is known as the "maintaining" circuit.

The rotary line switch LS, consists of a stationary member and a rotary member, as in the case of the maintaining switch. The stationary member consists of a disc of bakelite 27 or other similar insulating material on which are mounted a circular track 6, and segments 7, 8, 9, 10. Segment 9 is connected by wire $9^x$ to the line, and segment 10 is connected by the wire $10^x$ to the line or high voltage tube 32 of the said combustion safety control and thence runs to the line wire $10^y$. It is seen that a portion of segments 9 and 10 overlap so that fingers $9^A$ and $9^B$ of the rotary member of the line switch may rest respectively on 9 and 10 at the same instant. Track 6 is connected to the stator of the control motor switch by line $6^x$ and thence to the primary of the coke coil and from there to the line (see wire $6^y$). Segment 7 is connected to a burner motor 28 by wire $7^x$ and segment 8 is connected to the ignition by wire $8^x$, both said wires leading thence to the line. It will be noted that each track and segment of the stationary portion of the maintaining switch is suitably spaced and therefore insulated from each other, the same being true with respect to the tracks and segments of the stationary member of the line switch. With reference to the latter, attention is directed to track 6 which describes a complete circle, while segment 9 is sligtly less than 360°. Segment 7 extends approximately 180°, the remaining 180° described by continuing said segment being part (14) of the bakelite base and terminating in an insulated portion 12. The short arcuate extent of segments 8 and 10 are also apparent in the drawings.

The rotary member of the line switch (unassembled in the lower portion of Fig. 1, and assembled in Fig. 3,) consists of a spring bronze stamping mounted on a bakelite support 29 similar to the rotary member of the maintaining switch. Said rotary member is composed of two superimposed sections insulated from each other as indicated at C. One section comprises the fingers 6' and $9^A$ which fingers respectively contact as hereinafter set forth, with track 6 and segment 9 of the stationary member; while the other section consists of fingers 7', 8', $9^B$ which contact as hereinafter set forth respectively with segments 7, 8, 10 of the stationary member. It will be noted that the section comprising fingers 6' and $9^A$ is suitably insulated from the section having fingers 7', 8', and $9^B$.

As is well known in switches of this type, inclined tracks and inclined spring fingers are employed. Accordingly segment 7 slopes from its narrower portion clockwise to its broader end, which is the highest raised portion of the segment. At this point there is a drop, where bakelite part 14 begins, which latter slopes up to and terminates in the raised insulation 12. A drop is present here from 12 to 7. A gradual slope is also present from segment 10, clockwise around segment 9, the terminus of the latter being raised, thereby affording a drop to segment 10. Fingers 6', 7', 8', $9^A$ and $9^B$ all preferably incline or project away from the plane of bakelite mounting 29.

The maintaining switch and the line switch are essential elements of the motor switch. The rotary members of said switches are mounted on a rotatable shaft 18 suitably geared to or otherwise operatively connected, for relatively slow rotation, with the rotor 18' of the control motor. Said rotary members are mounted on said shaft 18 so that they are always in a definite relation to each other. Although the maintaining and line switches may be positioned in any desired operative relation with respect to the control motor, a compact unit results by locating one of said switches on each end of the motor, suitably enclosed by a motor housing. However, for convenience in illustration, the switches and control motor are simply connected by proper wiring in a diagrammatic representation. It is apparent that the motor switch and line $6^x$, $6^y$, carrying high voltage from the line provides low voltage current in the secondary (20, 21), through the choke coil, for the operation of the room thermostat and maintaining or limiting device MS, and the low voltage side 25, 26 of the combustion safety control. The control motor is of that type well known to those familiar with the art and is connected in series in line $6^x$ with the primary of the choke coil K, the line current being insufficient to turn same over. To start such a motor it is necessary to short circuit the secondary, thereby increasing the current sufficiently in the primary to turn the motor over. It is thus seen that the control motor may be started and stopped by making or breaking the secondary circuit. In the present instance, a room thermostat and a low voltage switch in conjunction with the maintaining switch, all in the secondary, function to affect the secondary and consequently the control motor as above mentioned.

The combustion safety control herein illustrated is well known but has been shown in detail to promote a clearer understanding of the improvements.

Figures 4, 5:
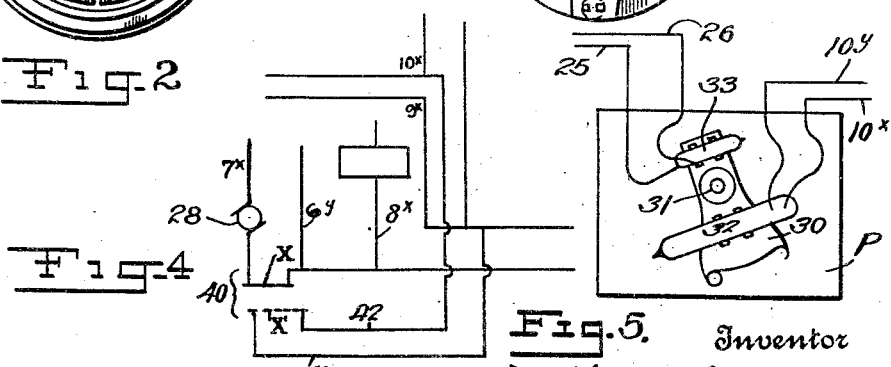
Fig. 4 is a diagrammatic view of the manual recycling arrangement.
Fig. 5 is a diagrammatic view of the combustion safety control with one side of the housing removed.

Referring now to the combustion safety control P, shown in section in Fig. 5, any suitable housing may be employed on which is mounted the pivoted member 30. The housing may be located in the stack for operation by thermal conditions therein, in which case, said member 30 may be composed of metallic strips responsive to changes of heat and cold, as is well known in thermostatic elements. However, in the illustrated embodiment, said member 30 is keyed to or otherwise operatively connected with a rod 31 extending into the stack and actuated by a suitable thermo-responsive element (not shown) positioned within the stack. Although any suitable switch elements may be employed, the well-known mercury tube switches have been illustrated. As shown, the mercury tube 32 is preferably mounted on the member 30, said tube having at one end electrodes connected to the line or high voltage by wires $10^x$ and $10^y$. The switch 32 will be hereinafter referred to as the "high voltage switch or tube". Another switch or tube 33, hereafter referred to as the "low voltage switch or tube", is likewise mounted on element 30 and has electrodes therein connecting with wires 25 and 26. It will be noted that these tubes, arranged on either side of pivot 31, are mounted so that when one switch is closed, the other is open, and vice versa. Any suitable mounting and arrangement of said switches will suffice so long as they are arranged to make and break their respective circuits as set forth.

The operation of the combustion safety control is apparent. When the stack is cool, the position of the switches is as shown in Fig. 5, the wires 25, 26 being closed by low voltage switch 33, and the circuit through wires $10^x$ and $10^y$ being open, as seen by the position of switch 32.

The combustion safety control is generally located in the stack, or other suitable place in order to place the thermostatic element of the combustion safety control where the temperature will be high enough to cause it to function properly. When the temperature reaches a predetermined degree the thermostatic element of the combustion safety control expands and tilts the mercury or other switches 32, 33 contained therein, thereby establishing an electrical connection from the line $10^y$, through the high voltage switch 32, wire $10^x$ to segment 10 of the rotary line switch, and at the same time it breaks the low voltage circuit, through wires 25 and 26 by the opening of low voltage switch 33. Obviously when the temperature drops and the stack cools, the thermostatic element therein will function to return the switches to the position depicted in Fig. 5, with line 25, 26 closed and line $10^x$ and $10^y$ open.

In Fig. 1 is shown a room thermostat blade T which moves either to right or left for contact with the buttons R or B, depending upon whether heat is called for or not.

The operation of the organization is as follows:—Beginning with the elements in neutral position; the rotary member RM of the maintaining switch being mounted on shaft 18, will lie on the stationary member of said switch, with the fingers 2, 3 and 5 in the same relative position as shown in Fig. 1. That is, finger 2 will contact with button 4, while finger 3 contacts track 3′. At this time finger 5 performs no function. Obviously the combustion safety control will be in "cool" position, as shown in Fig. 5, and switch 33 will be closed, and wires 25, 26 therefore united. The room thermostat T will be between buttons B and R also. The control motor will be idle due to the secondary of the choke coil being open as follows: There is a gap in the secondary between 3′ and 5′, these elements being otherwise connected from 5′ through 26, switch 33, 25, 21, K, 20, 3′ to 3; there is also a break between thermostat T and button R, the same being otherwise connected through the choke as follows; R, 24, 4, 2, 3, 3′, 20, K, 21, 2′, 22 to T. The break between T and B is evident also but is of no moment at this time.

Figure 3:
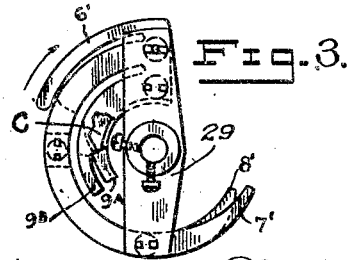
Fig. 3 is a plan view of the under side of the rotary member of the rotary line switch.

The rotary member of the line switch LS is also mounted on the shaft 18 in such a relation that it will be on the stationary member of said switch with the fingers 6′, 7′, 8′, $9^A$ and $9^B$, in the same relative position as shown in Fig. 3. Accordingly, in the neutral position each rotary member is mounted on shaft 18 in a definite relation to each other and to their respective stationary members. With the line switch in neutral position finger 6′ will be on track 6, fingers 7′ and 8′ will both be on insulated segment 12 and fingers $9^A$ and $9^B$ will both be on segment 9. The circuits through the line switch LS will therefore be as follows:—An open circuit leads from the line through $9^x$ to 9, $9^B$, fingers 7′ and 8′ to insulation 12, the remainder of this circuit leading from the line through the ignition, $8^x$ to 8 and from the line through burner motor 28, $7^x$ to 7. It is evident therefore that the circuits through the burner motor and ignition are now both open. Segment 10 has no part of the rotary member on it at this time. Segment 10 is therefore "dead", having connections $10^x$ and $10^y$ to the line, which, however, is open at the electrodes in high voltage switch 32, since the combustion safety control P is in "cool" position (see Fig. 5). A closed circuit exists through the control motor as follows: from line to $9^x$, 9, $9^A$, 6′, 6, $6^x$, control motor, K, $6^y$ to line. As heretofore noted, the control motor located in the closed primary will not rotate until the secondary is "shorted", but at this time the secondary is open, as above described and therefore the motor is idle. It may be noted here that the rotary members of the two switches turn clockwise, as indicated by the arrows.

When more heat is called for the room thermostat blade T moves to the right for contact with button R to close the circuit through 24 to contact button 4, fingers 2, 3 of the rotary switch member RM, and track 3′ of the maintaining switch MS, through 20, K, 21, 2′ 22 to T. This short circuiting of the secondary causes the control motor in the switch to operate the shaft 18, carrying the rotary members of the maintaining (MS) and line (LS) switches (as described, said shaft is operatively connected with the control motor so that the shaft and rotary members thereon will rotate very slowly) until the maintaining circuit (2′, 21, K, 20, 3′) is completed through tracks 2′ and 3′ by finger 2 leaving button 4 and contacting track 2′, the rotary member RM rotating very slowly through 180° and coming to rest upon completion of the 180° arc with finger 2 off of track 2′ (thus breaking the maintaining circuit) but resting on button 1 and with fingers 3 and 5 on track 3′ and segment 5′ respectively, preparatory to starting the closing cycle of 180° when the thermostat contacts on B.

During this appreciable interval or starting cycle of 180°, the oil burner has started and is operating due to the line switch having performed the following functions:

At the same time the rotary member of the maintaining switch is operating through the 180° arc from button No. 4 to button No. 1, the rotary member of the line switch being on the same rotating shaft 18, is traveling at the same speed. When fingers 7′ and 8′ drop from the raised insulated segment 12 onto segments 7 and 8, a circuit is made from line 9ˣ through segment 9 to the rotary member of the line switch through fingers 9ᴮ and 7′, segment 7 to line 7ˣ through burner motor 28 through manual re-cycling switch (X) to the line, thus starting the burner motor. At the same time, a connection is established from line 9ˣ, segment 9, fingers 9ᴮ and 8′, segment 8 to line 8ˣ through the ignition to the line, thus simultaneously starting the electrical ignition. At the same time current continues to pass from 9ˣ through 9, 9ᴬ, 6′, 6 and 6ˣ, through the control motor to the primary of the choke coil and thence to the line by 6ʸ. Ordinarily the burner is ignited in a few seconds after the circuit is made to the burner motor, and heat is transmitted to the stack, while the switches are slowly describing their 180° travel, causing the theremostatic element of the combustion safety control to expand, tilt the mercury or other switches—namely the high voltage and low voltage tubes 32, 33 in the combustion safety control, and establish connection from the line through the high voltage tube 32, wire 10ˣ to contact 10 before the fingers 9ᴬ and 9ᴮ reach this contact. Obviously tube 33, in simultaneously tilting with tube 32, breaks the connection between wires 25, 26 before the 180° cycle is completed.

The control motor stops at the end of the 180° cycle due to the opening of the secondary or maintaining circuit for the accompanying reason. When the end of said cycle is reached the burner motor is running and therefore the "running position" of the switches will be described. The rotary member of the maintaining switch will now rest with finger 5 on segment 5′, finger 2 on button 1 and finger 3 on track 3′. Since finger 2 is now off of track 2′, the maintaining circuit is broken with the attendant stopping of the control motor. However, the gap between segment 5′ and track 3′, which existed at the starting of the cycle, is now bridged or closed by fingers 5 and 3, which latter is connected to the line 20 by track 3′. This gap between the secondary of the choke coil and wires 25 and 26, now being closed, would again short circuit the secondary circuit, with the attendant starting of the motor, if it were not for the fact that this circuit has been previously broken, and before the end of the 180° cycle, by the tilting of the low voltage tube 33 in the combustion safety control in response to the heat of the stack, as previously described.

When the control motor is thus at rest, with the maintaining switch in the position just described, the rotary member of the line switch LS also comes to rest in the following position:—finger 6′ on track 6, fingers 7′ and 8′ on segment 7, finger 9ᴬ on the overlapping extension of segment 9 and finger 9ᴮ on the overlapping extension of segment 10.

When the motor switch stops at the running position just described, the rotary member of the line switch has come to rest with contacts established between track 6, finger 6′, finger 9ᴬ and segment 9, and between segment 10, finger 9ᴮ, fingers 7′ and 8′ to segment 7. The burner motor thus continues operating on current from the line as follows: line, 10ʸ, the now closed high voltage switch 32 (due to its tilting from heat in the stack as previously described) 10ˣ, 10, 9ᴮ, 7′, 7, 7ˣ, motor 28, line. At the same time a complete closed circuit exists through the control motor and primary of the choke as follows: line, 9ˣ, 9, 9ᴬ, 6′, 6, 6ˣ, control motor, choke K, 6ʸ to line. At this time, as aforementioned, i. e., when the stack is heated, the low voltage mercury switch 33 is open and the high or line voltage switch 32 is closed, the former having been tilted to the right and the latter to the left of their positions shown in Fig. 5. When less heat is called for, contact is made in the thermostat between the blade T and contact post B closing the secondary circuit to contact button No. 1 and track 3′ of the maintaining switch, through the rotary switch member. This causes the motor switch to operate until the maintaining circuit is completed through tracks 2′ and 3′, passing over break in track 2′. The rotary member will rotate 180° and come to rest with finger 2 on button No. 4 and finger 3′ still on track 3, (due to finger 2 leaving track 2′), ready for the starting cycle when the thermostat demands more heat.

At the same time the rotary member of the maintaining switch is operating over tracks 2' and 3', the rotary member of the line switch is traveling at the same speed. When finger No. 7' leaves track No. 7, falling on insulated portion 14 circuit is immediately broken to the burner motor. The rotary member continues to revolve—coming to rest at the completion of the 180° arc, with fingers No. 7' and 8' resting on an insulated segment 12.

Should the line current be interrupted for any reason while the burner is in running position, or the flame for any other cause be prematurely extinguished, the thermostatic element in the combustion safety control due to cooling of the stack, will contract and tilt the low and high voltage mercury switches 33, 32, which will assume the "cool" position shown in Fig. 5, thereby breaking the line circuit to segment 10 via wire 10$^x$ and simultaneously closing wires 25, 26. Consequently upon resumption of the line current, segment 10 will be "dead" and ineffective and the ignition and burner motor will be idle. But with my improved switch, the rotary member of the line switch is now resting with a portion of segment 9 overlapping a portion of segment 10, the fingers 9$^A$ and 9$^B$ resting simultaneously on the respective segments as described with respect to the "running position" of the switches. Consequenly, when the line current is reestablished, current will flow from the line through 9$^x$ to segment 9, through fingers 9$^A$ and 6' to circular track 6, thereby allowing current to flow through 6$^x$ to the control motor and the primary of the choke coil, wire 6$^y$ to the line. At the same time that this primary or line circuit is closed through the control motor and choke K, the switches in the combustion safety control are in the "cool" position, depicted in Fig. 5, and therefore the secondary or maintaining circuit is closed or "shorted" thus starting the control motor. This "short circuit" is easily traced when it is remembered that the rotary member RM of the maintaining switch is in "running position", i. e., at the end of its 180° starting cycle, with finger 5 on segment 5', and finger 3 bridging over to track 3. The circuit is as follows: segment 5', 26, switch 33, 25, 21, K, 20, 3', 3, 5, to segment 5'.

As explained, this closed secondary circuit of the choke coil, will cause the control motor to turn the rotary members of the maintaining and line switches through 180°, until they reach the normal starting position (hereinbefore described as "neutral"). It is obvious that during this "recycle of 180°" finger 5 will leave segment 5', thus breaking the "short circuit" and the motor would thus stop, if it were not for the fact that finger 2 of the rotary member of the maintaining switch, leaves button 1 and contacts track 2' thereby closing the maintaining circuit 2', 21, K, 20, 3', 3, 2 to 2', which now supplies a short circuit of the secondary thus keeping the control motor rotating. Therefore, simultaneously with the completion of the "recycle" or "idle cycle" of 180°, a starting cycle of 180°, as described earlier, will ensue due to the same relation of parts existing, as existed originally when the room thermostat T was calling for heat. The control motor and switches will come to rest at the end of the 180° starting cycle for reasons previously set forth. Consequently, upon the resumption of the line current, the control motor and rotary switches travel 360°, the first 180° being an idle cycle and the last 180° being the "useful" or starting cycle.

Obviously, should the resumption of line current come when the blade T is in neutral position, the control motor will stop at the end of the "idle" 180° cycle, leaving the switches, etc., in starting position, ready for operation as originally described. It is apparent, therefore, that with the present improvements, if for any reason the line current fails when the burner motor is running, or the flame for any reason is prematurely extinguished, when the line or source of current is re-established, manual recycling of the line switch (in order to again start the burner motor and ignition) is unnecessary.

If for any reason during the starting cycle the flame does not light and consequently the combustion safety control does not operate so that switch 32 remains open, the rotary member of the line switch will come to rest with contacts 9$^A$ and 9$^B$ both on segment 10, and it will then require that a recycling switch 40 be manually depressed until contact 9$^A$ reaches segment 9; when the control motor will continue operating to the starting position. In thus arranging the parts to produce the above result, a safety feature of great importance is provided. Should the burner motor otherwise be permitted to supply fuel to the burner, ignition being lacking, a quantity of unburned fuel would collect in the combustion chamber. Should ignition then occur, the possibility of disastrous consequences is obvious. Accordingly, this proportioning of parts causes cessation of the fuel supply should ignition not occur during the starting cycle. The diagram of Fig. 4 illustrates the manual recycling operation, X representing the normal position of the recycling switch 40, and the dotted line X' the recycling position assumed only while the same is held depressed manually. While in this latter position, it is obvious that, through wires 41 and 42 connecting with wires 9$^x$ and 10$^x$ respectively, line current is again established through the control motor, and primary of the choke K, and since the secondary at this time is closed, recycling of the motor switch will result. It will be seen that the fingers 6' and 9^A of the rotary member of the line switch are insulated from fingers 7', 8', 9^B, consequently, the burner motor will not operate until the normal running position of the switch has been reached. The overlapping part of segments 9 and 10 are so proportioned that finger 7' will leave segment 7 and fall on the insulated part of the disc before finger 9^B leaves segment 10 to contact with segment 9. Consequently, the burner motor cannot operate in case of ignition failure (wherein switch 32 remains open), until the switch has rotated sufficiently to bring fingers 7' and 8' in contact with segments 7, 8.

In the appended claims terms such as "segments," "insulated," "fingers," "cycle" and other terms have been used to designate certain elements having certain functions. It will be understood, however, that these terms are used generically to indicate such elements and elements having the same functions and operating in substantially the same manner. It is obvious also that the details of construction and operation may be varied within certain limits without departing from the scope of the invention.

I claim:

1. In a control for an electric motor, the combination of an auxiliary control motor and a rotary switch, having contacts movable in synchronism with the auxiliary control motor to carry out a predetermined cycle of operations, the stationary member of the rotary switch having a plurality of concentric segments insulated from each other, one of said segments being connected to the auxiliary control motor, a second segment connected to the electric motor being controlled, a third segment connected directly to the line current and a fourth segment connected to the line current under certain conditions and having a part overlapping the third mentioned segment, the rotary element of said switch consisting of two sections insulated from one another, the sections being so arranged that fingers of one section will rest on the second and fourth mentioned segments after a cycle of operations have been completed, and simultaneously fingers of the other section will rest on the first and third mentioned segments, so that should the line current be interrupted and the conditions necessary to connect the line current with the fourth mentioned segment fail, the control motor may operate to carry out the normal cycle of operations upon re-establishment of the line current.

2. In a control for an electric motor, in combination with an auxiliary control motor and a source of power, of a rotary switch having a plurality of concentric segments insulated from each other, one of said segments being connected to the auxiliary control motor, a second segment directly connected to the source of power, a third segment connected to the motor being controlled, and a fourth segment connected to the source of power only under certain conditions, the second and fourth mentioned segments having overlapping portions, a rotary member for said switch, consisting of two sections insulated from each other and so arranged that when the fingers of one section rest on the third segment and the overlapping portion of the fourth segment, the fingers of the other section will rest on the first segment and the overlapping portion of the second segment.

3. In a control for an electric motor, in combination with an auxiliary control motor and a source of power, of a rotary switch having a plurality of segments insulated from each other, one of said segments being connected to the auxiliary control motor, a second segment directly connected to the source of power, a third segment connected to the motor being controlled, a fourth segment connected to the source of power only under certain conditions, a rotary member for said switch consisting of two sections insulated from each other and so arranged that when the fingers of one section rest on the third and fourth segments, the fingers of the other section will rest on the first and second segments.

4. In a control for an electric motor, the combination of an auxiliary control motor and a rotary switch, having contacts movable in synchronism with the auxiliary control motor to carry out a predetermined cycle of operations, the stationary member of the rotary switch having a plurality of segments insulated from each other, one of said segments being connected to the auxiliary control motor, a second segment connected to the electric motor being controlled, a third segment connected directly to the line current and a fourth segment connected to the line current under certain conditions and being partly co-extensive with the third mentioned segment, the rotary element of said switch consisting of a plurality of sections out of contact with one another, the sections being so arranged that fingers of one section will rest on the second and fourth mentioned segments after a cycle of operations has been completed, and simultaneously fingers of the other section will rest on the first and third mentioned segments, so that should the line current be interrupted and the conditions necessary to connect the line current with the fourth mentioned segment fail, the control motor may operate to carry out the normal cycle of operations upon re-establishment of the line current.

5. In a burner control apparatus the combination of a burner motor, a control motor therefor, power terminals for both said motors, means actuated by said control motor to connect certain of said power terminals to said burner motor and subsequently to connect said burner motor with another of said terminals while said control motor receives power from its original terminals, and disabling means for both motors, one of said last-mentioned means including a power restoring means for said control motor under predetermined conditions.

6. In a burner control apparatus, the combination of a burner motor, a control motor therefor, a source of power having power terminals for both said motors, means actuated by said control motor to connect certain of said power terminals to said burner motor and subsequently to connect said burner motor with another of said terminals while said control motor receives power from its original power terminals and thermally responsive means for disabling both motors, one of said last-mentioned means including a power restoring means for said control motor under predetermined conditions.

7. In a burner motor apparatus, the combination of a burner motor, a control motor therefor, power terminals for both said motors, means operable by said control motor to connect said burner motor to certain of said power terminals and subsequently to another of said power terminals while said control motor receives power from its original power terminal, thermally responsive means for simultaneously energizing said last-mentioned burner terminal and disabling said control motor in response to heat resulting from the operation of the burner motor and vice versa in response to cold, whereby when said power source fails and said thermal means cool said control motor will be operatively connected to said power source for operating said first-mentioned means upon resumption of power.

8. In a burner motor apparatus, the combination of a burner motor, a control motor therefor, power terminals for both said motors, means operable by said control motor to connect said burner motor to certain of said power terminals and subsequently to another of said terminals while said control motor receives power from its original power terminals, means for stopping said control motor, means independent of said control motor for simultaneously energizing said burner motor terminals and disabling said control motor and vice versa under predetermined conditions.

9. An electrically controlled burner apparatus comprising a burner motor, a control motor therefor, a plurality of circuits for said motors, means operable by said control motor for affecting said circuits to carry out a predetermined cycle of operations and a recycling circuit for restoring said control motor to starting position under at least three abnormal conditions of said burner motor.

10. An electrically controlled burner apparatus comprising a burner motor, a control motor therefor, a plurality of circuits for said motors, means operable by said control motor for affecting said circuits to carry out a predetermined cycle of operations and a thermally controlled recycling circuit for restoring said control motor to starting position under at least three abnormal conditions of said burner motor.

Witness my hand this 11th day of March, 1927, at the city of New York, county of New York, State of New York.

WILL N. CLURMAN.